United States Patent [19]

Tomlinson

[11] Patent Number: 4,860,317
[45] Date of Patent: Aug. 22, 1989

[54] NOISE-REDUCTION SIGNAL PROCESSING ARRANGEMENT

[75] Inventor: Martin Tomlinson, Devon, England
[73] Assignee: Devon County Council, Devon, United Kingdom
[21] Appl. No.: 842,320
[22] Filed: Mar. 21, 1986
[30] Foreign Application Priority Data Mar. 26, 1985 [GB] United Kingdom ................. 8507903

[51] Int. Cl.⁴ .............................................. H04B 7/01
[52] U.S. Cl. ........................................ 375/58; 375/96; 375/99; 364/746; 455/12; 358/133
[58] Field of Search ...................... 375/58, 99, 96, 103, 375/60, 34, 27, 18, 122; 455/63, 12; 371/43; 358/13, 133, 138; 364/746

[56] References Cited

U.S. PATENT DOCUMENTS

| | | | |
|---|---|---|---|
| 3,388,330 | 6/1968 | Kretzmer | 375/18 |
| 3,792,356 | 2/1974 | Kobayashi | 375/18 |
| 4,005,411 | 1/1977 | Morrin, II | 358/135 |
| 4,123,625 | 10/1978 | Chow | 375/18 |
| 4,178,550 | 12/1979 | Acampora | 371/43 |
| 4,267,580 | 5/1981 | Bond et al. | 364/746 |
| 4,468,708 | 8/1984 | Coleman, Jr. | 358/133 |
| 4,630,032 | 12/1986 | Gordon et al. | 371/43 |
| 4,653,068 | 3/1987 | Kadin | 375/58 |
| 4,672,633 | 6/1987 | Claasen et al. | 375/58 |

FOREIGN PATENT DOCUMENTS

WO83/00019 5/1983 PCT Int'l Appl. .
2160076A 5/1985 United Kingdom .

Primary Examiner—Benedict V. Safourek
Attorney, Agent, or Firm—Hale and Dorr

[57] ABSTRACT

An apparatus and method for reducing the effect of noise in a signal handling system which includes a noise-susceptible link (12). The apparatus also includes a first signal processor (13) positioned upstream from the link (12) with a sampled data filter (23) having an inverse high-pass characteristic, and a second signal processor (16) positioned downstream from the link (12) with a sampled data first filter (26) having a high-pass characteristic and a second filter (27) having a low-pass characteristic. The two sampled data filters have reciprocal responses and each employ modulo N arithmetic, i.e., when the output reaches a level N it overflows. Thus, the filter (26) downstream of the link (12), which is preferably a digital filter, has a transfer function (P(z)) modulo N, while the filter (23) upstream of the link, also preferably a digital filter, has the inverse transfer function (1/P(z)) modulo N. The second filter (27) downstream of the link (12) has a transfer function which is substantially orthogonal to that of the first downstream filter (26). As a result, signals passing through the system, provided that they lie within the passbank of the second downstream filter (27), are largely unaffected, while noise picked up in the link (12) is confronted by an orthogonal filter pair and is consequently much reduced in amplitude. The link (12) may include a quantizing circuit for restricting the number of bits of the signal transmitted over the link (12), in which case the arrangement in accordance with the invention operates to reduce quantization noise.

18 Claims, 10 Drawing Sheets

NOISE-REDUCTION SIGNAL PROCESSING ARRANGEMENT

The present invention relates to a signal processing arrangement for reducing the effect of noise in a signal-handling system that includes a noise-susceptible link. In particular, but not exclusively, the invention relates to such noise-reduction signal processing arrangements suitable for incorporation in communications systems (for example, satellite communication systems) and in recording/playback apparatus. The transmission of television signals in a direct broadcast satellite system is an area in which the invention is especially applicable.

According to one aspect of the present invention, there is provided a signal processing arrangement for reducing the effect of noise in a signal-handling system that includes a noise-susceptible link, the signal processing arrangement comprising:

first signal processing means located upstream of the link and arranged to receive and process prior to passage over the link, an information signal whose frequency components of interest lie within a predetermined frequency range, and second signal processing means located downstream of link and arranged to recover the information signal from the noise corrupted signal received over the link, the second signal processing means including first and second filters the passband of the second of which spans the said predetermined frequency range, and the first signal processing means including an inverse filter to the first filter, the inverse filter and the first filter being constituted by sampled data filters employing modulo N arithmetic and the first filter, apart from effects resulting from its modulo N implementation, being substantially orthogonal to the second filter.

According to another aspect of the invention, there is provided a method of reducing the effect of noise in a signal-handling system that includes a noise susceptible link, including the steps of:- feeding an information signal, which has frequency components of interest lying within a predetermined frequency range, to a first sampled data inverse filter having a predetermined impulse response combined with a modulo N overflow characteristic, passing the filtered information signal over the noise susceptible link, receiving the filtered information signal from the noise susceptible link and feeding it to a first receiver sampled data filter which has a modulo N overflow characteristic and is substantially the reciprocal of the sampled data inverse filter, passing the signal present at the output of the first receiver sampled data filter through circuit means including a further filter, which further filter has a passband including the said frequency range and is substantially orthogonal to the said first receiver filter in respect of signals received at the input of the first receiver filter with a magnitude less than $N/2$, whereby noise received by the first receiver filter having an amplitude less than $N/2$ is largely eliminated by the orthogonal pair formed by the first receiver and further filters.

Considered together, the inverse filter and the first receiver filter have no substantial effect on the information signal, the product of their transfer functions being unity. Similarly, the further or second filter will allow the information signal to pass undistorted as its passband encompasses the frequency range of the signal. The noise-reduction signal processing arrangement thus has no overall effect on the information signal. However, any noise entering the system via the noise-susceptible link will be confronted in the second signal processing means with the orthogonal filter pair so that this noise will be substantially eliminated from the recovered information signal.

The use of modulo N arithmetic in the inverse filter avoids problems of instability and does not affect signal recovery since the first receiver filter is also implemented using modulo N arithmetic. Furthermore, the noise reduction characteristics of the orthogonal filters are not impaired by the use of modulo N arithmetic in the first receiver filter provided the noise amplitude is substantially less than $N/2$.

An added advantage of using modulo N arithmetic in the implementation of the inverse filter is that it automatically provides a degree of scrambling of the signal by the first signal processing means.

Typically, the first and second filters downstream of the link are high and low pass filters respectively.

The implementation of the first and inverse filters (and possibly also the second filter) as sample data filters may be effected using digital or analogue techniques.

The signal-handling system incorporating the noise reduction signal processing arrangement may, for example, be a communications system or a recording/playback system, the noise-susceptible link in these cases being respectively the communications channel between the system transmitter and receiver, and the link formed by the record and playback transducer or transducers and the recording medium.

The invention also includes a communication system for receiving an information carrying signal transmitted over a noise-susceptible link after having been subjected to filtering by a digital filter employing modulo N arithmetic and having an impulse response characteristic $1/P(z)$ modulo N, wherein the receiver comprises a first digital filter employing modulo N arithmetic and having an impulse response characteristic at least approximating to $P(z)$ modulo N where $$[1/P(z) \text{ modulo } N] \cdot [P(z) \text{ modulo } N] = 1,$$

and a second digital filter having an impulse response characteristic $Q(z)$ where, for signals at the input of the first filter having a magnitude less that $N/2$, $Q(z)$ is defined substantially by $P(z)$. $Q(z)=0$. Other aspects of the invention include a satellite communications transmitter for transmitting information over a noise-susceptible link, wherein the transmitter includes a digital sampled data filter incorporating modulo N arithmetic to provide an overflow characteristic for avoiding instability, and a satellite communications receiver which includes a digital sampled data filter using modulo N arithmetic and a second receiver filter which, apart from effects resulting from the modulo N arithmetic of the first receiver filter, is substantially orthogonal to the second receiver filter.

Various other novel aspects and features of the invention will become apparent from the following description, given by way of example, of several noise reduction signal processing arrangements, reference being made to the accompanying drawings in which.

Figure 1:
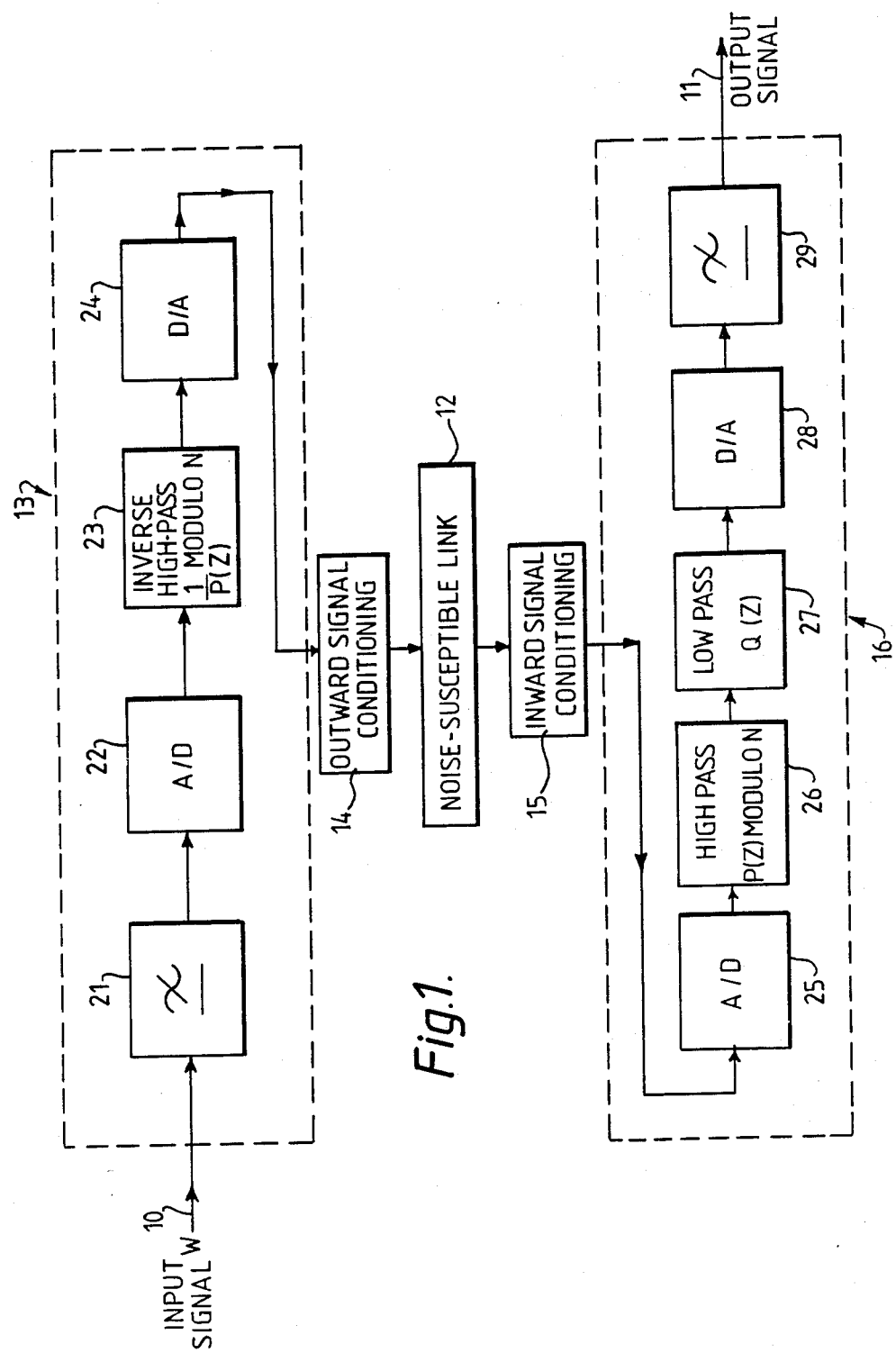
FIG. 1 is a block diagram of a first noise/reduction signal processing arrangement for baseband signals.

FIG. 1 depicts in general form a signal-handling system arranged to pass an analogue input signal W between a system input 10 and system output 11 via a noise-susceptible link 12. In the present example, the input signal W has frequency components of interest lying within a frequency range extending from zero to $f_c$ Hz.

Prior to passage over the link 12, the analogue signal is passed through first signal processing means 13 and outward-signal conditioning means 14, the latter being intended to provide a signal of a form representative of the output of the signal processing means 13 but with characteristics matched to those of the link 12. Typically, the signal conditioning means 14 comprises a modulator.

The signal received over the link 12 is first passed through inward-signal conditioning means 15 which reverses the process effected by the outward-signal conditioning means 14. Thus, the inward-signal conditioning means 15 is typically a demodulator. The output of the inward-signal conditioning means 15 is then passed through a second signal processing means 16 to recover the original analogue signal W.

The first and second signal processing means 13 and 16 together consititute a noise-reduction signal processing arrangement for reducing the effect of noise introduction into the signal in the link 12.

The first signal processing means 13 comprises an analogue low-pass input filter 21 with a cut-off frequency $f_c$, an analogue to digital (A/D) converter 22 with a sampling rate of at least $2f_c$, an inverse high-pass digital filter 23, and an output digital to analogue (D/A) converter 24. The second signal processing means 16 comprises an input A/D converter 25, a high-pass digital filter 26, a low-pass digital filter 27, a D/A converter 28, and an output analogue low-pass filter 29 for smoothing the output of the D/A converter 28.

The low-pass digital filter 27 has a cut-off frequency equal to $f_c$ and a Z-transform transfer function Q(z). The high-pass digital filter 26 also has a cut-off frequency of $f_c$, its Z-transform transfer function being:

P(z) modulo N where the epithet "modulo N" indicates that modulo N arithmetic is used in implementation of the filter, that is, the filter output A is limited to the range:

$-N/2 < A < N/2$

Output A can be defined as $A = I - Q.N$ where I is the input and Q=integer [I+N/2/N]. The filter 23 is the inverse of the filter 26 and similarly uses modulo N arithmetic in its implementation, its transfer function being:

$(1/P(z))$ modulo N with $[(1/P(z))$ modulo $N] \cdot [P(z)$ modulo $N] = 1$

The use of modulo N arithmetic in the filters 23 and 26 is a result of the need both to ensure the stability of the inverse filter 23 and also to maintain the inverse relationship between the filters 23 and 26 (this latter requirement making it necessary to use modulo N arithmetic in the filter 26 as well as in the filter 23).

The functions P(z) and Q(z) are chosen to be mutually orthogonal, that is:

$P(z) \cdot Q(z) = 0$ so that for small signals, where the modulo N nature of the filter 26 does not come into play, the filters 26 and 27 operate as mutually orthogonal filters; this, however, is not the case for signals for a magnitude $> N/2$.

Considering now the passage of a signal W through the FIG. 1 system, upstream of the noise-susceptible link 12 the signal W is subject to processing in the digital filter 23. On passage through the link 12, the signal is corrupted by noise and/or interference. However, provided the noise power is sufficiently small, the low frequency components of noise will be removed by the following modulo N high-pass filter 26 while the high frequency noise components will be removed by the low-pass filter 27; in other words, the filters 26 and 27 act as an orthogonal filter pair to eliminate noise. The wanted signal, on the other hand, is recovered in digitised form after passage through the filter 26 and since, like the original signal, this signal has only low frequency components, the following low-pass filter 27 has no effect. After D/A conversion and further filtering, the signal W is recovered substantially noise free.

As already indicated, noise reduction depends on the noise level being below the modulo N threshold. More precisely, if the received noise power is 0, then for the noise reduction process to work well, the output noise power should be very much less than $N^2/4$, that is $$\sigma \cdot \frac{\sum_{i=1}^{\infty} P_i^2}{P_0^2} << \frac{N^2}{4}$$

where $P_0 + P_1 z^{-1} + P_2 z^{-2} \ldots = P(z) = \sum_{n=0}^{\infty} P_n z^{-n}$ In practice it is not possible to obtain completely mutually orthogonal functions for P(z) and Q(z) while providing a restricted range of magnitudes for the coefficients of P(z).

Figure 2:
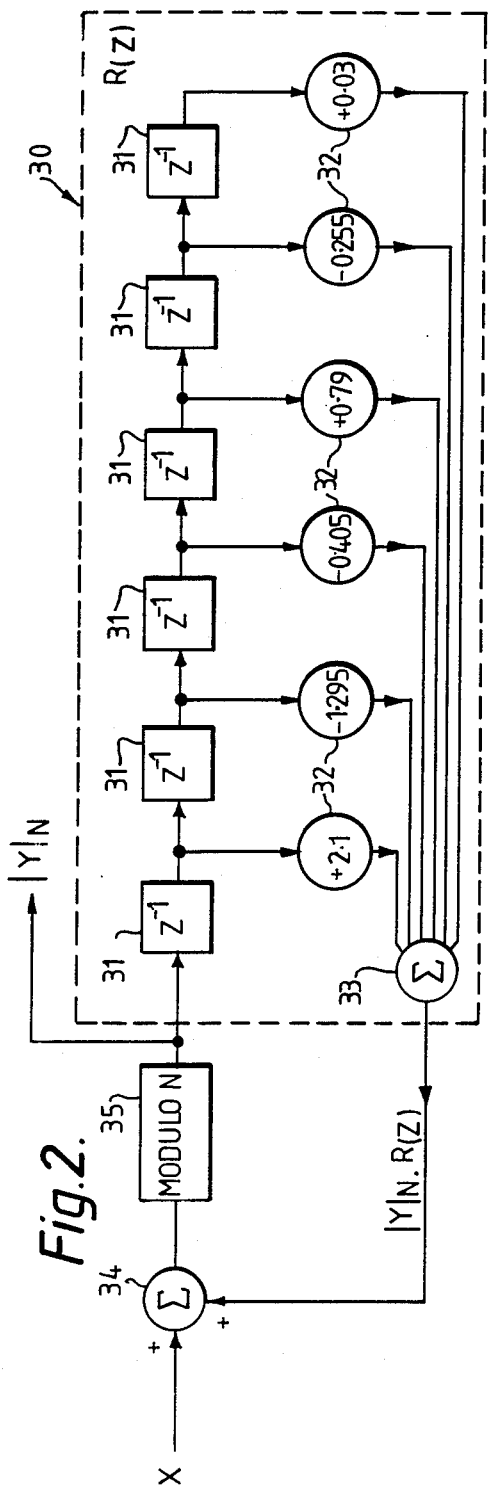
FIG. 2 is a block diagram of a digital filter forming part of the arrangement of FIG. 1 and located upstream of the noise susceptible link.
Figure 3:
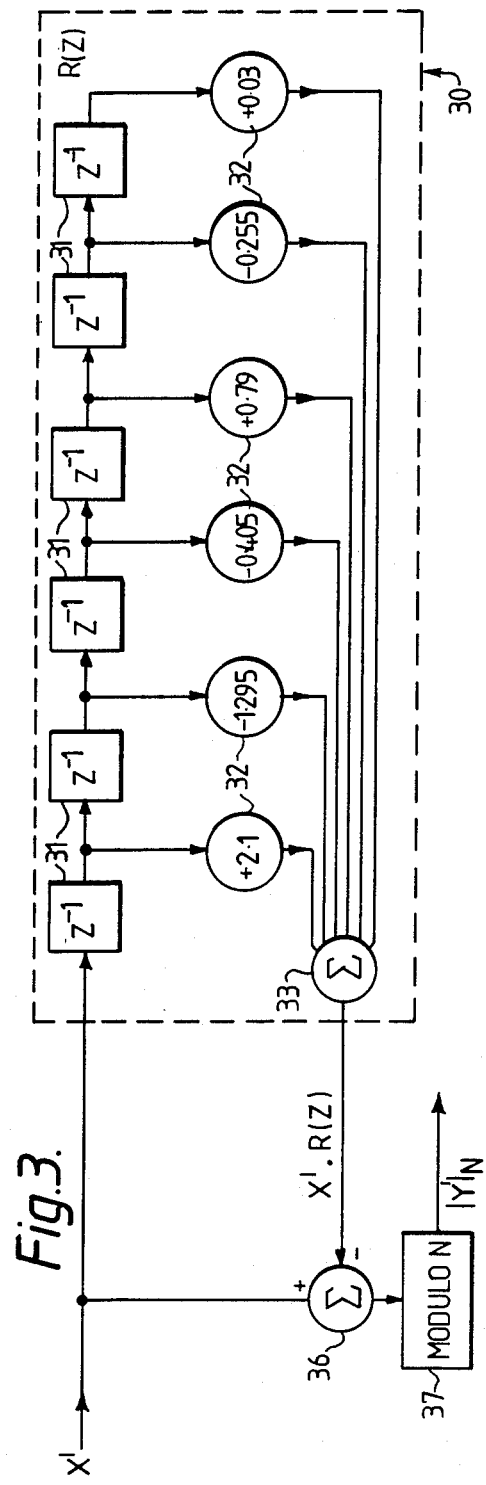
FIG. 3 is a block diagram of a high-pass digital filter which is the reciprocal of the filter of FIG. 2 and is located downstream of the noise-susceptible link in the arrangement of FIG. 1.

Suitable forms for the filters 23 and 26 will now be described. If the transfer function P(z) is expressed in the form (1−R(z)) then for the filter 23:

$$|Y|_N/X=[1/P(z)] \text{ modulo } N=[1/(1-R(z))] \text{ modulo } N \quad |Y|_N=|X+|Y|_N R(z)$$

where X is the input to filter 23 and $|Y_n|$ is the modulo N output. Similarly, for the filter 26:

$$|Y'|_N=X'[1-R(Z)]$$

where X' is the input to the filter 26 and $|Y'|_N$ is the modulo N output. FIGS. 2 and 3 illustrate implementations of the filters 23 and 26 for R(z) of the following form $$R(z)=2.1z^{-1}-1.295z^{-2}-0.405z^{-3}+0.79z^{-4}-0.255z^{-5}+0.03z^{-6}$$

It will be seen that the implementation of R(z) is identical for both filters (see elements within dashed blocks 30), this implementation taking the form of a delay line of six cells 31 clocked at the system sampling rate with respective weighting multipliers 32 interposed between the output of each cell 31 and a summer 33.

In the FIG. 2 inverse filter, the output of the R(z) block 30 is the quantity $|Y|_N \cdot R(z)$; this quantity is fed to a summer 34, where it is added to the current filter input value X. The output of the summer 34 is restricted in a modulo N block 35 to provide the current $|Y|_N$ value constituting the current filter output; the current value of $|Y|_N$ is also fed to the input of the R(z) block 30. It will be appreciated that the modulo N block 35 will in practice be part of the summer 34.

In the FIG. 3 filter, the input to the R(z) block is constituted by the current value of the filter input X', the output of the block 30 being the quantity $X' \cdot R(z)$. This latter quantity is subtracted from the current filter input in a summer 36 and the result is subject to modulo N processing in block 37 to provide the filter output $|Y'|_N$.

With a transfer function P(z) of the specific form used in the FIG. 3 high-pass filter 26, a suitable form of the transfer function Q (z) for the low pass filter 27 to give a low cross-correlation function with P(z) is as follows:

$$Q(z)= -0.01z^7-0.03z^6-0.04z^5+0.042z^4+0.252z^3+0.575z^2+0.871z+1+0.871z^{-1}+0.57z^{-2}+0.252z^{-3}+0.042z^{-4}-0.04z^{-5}+0.03z^{-6}-0.01z^{-7}.$$

The above transfer function corresponds to a linear phase low-pass filter suitable for television applications. A suitable implementation of the low-pass filter 27 with Q(z) of the above form will be apparent to persons skilled in the art.

It is to be noted that scrambling is an automatic feature of the FIG. 1 system since the output of the inverse filter 23 bears little resemblance to the input signal W. However, should further scrambling be required, then the filter 23 can be given a transfer function of:

$$[1/(P_1(z) \cdot P_2(z))] \text{ modulo } N$$

where $P_1(z)$ corresponds to the previous high-pass function P(z) and $P_2(z)$ is a general impulse response introduced purely for scrambling purposes. It will be apparent that in this case, the filter 26 must be given complimentary transfer function of:

$$[P_1(z) \cdot P_2(z)] \text{ modulo } N.$$

The input signal W of the FIG. 1 system may, for example, be an audio or video signal while the system as a whole may be transmitter/receiver system or a record/playback system (magnetic or optical).

Although the FIG. 1 system is designed for an input signal having frequency components between zero and $f_c$ Hz, it will be appreciated that similar systems could be designed for signals with their frequency components of interest in a band offset from zero. In this case, the filter 27 would be arranged with a passband matching the frequency band of the signal with the filter 26 being of complimentary (orthogonal) form; the filter 23 would, of course, still have a transfer function that was the inverse of that of the filter 26.

Figure 4:
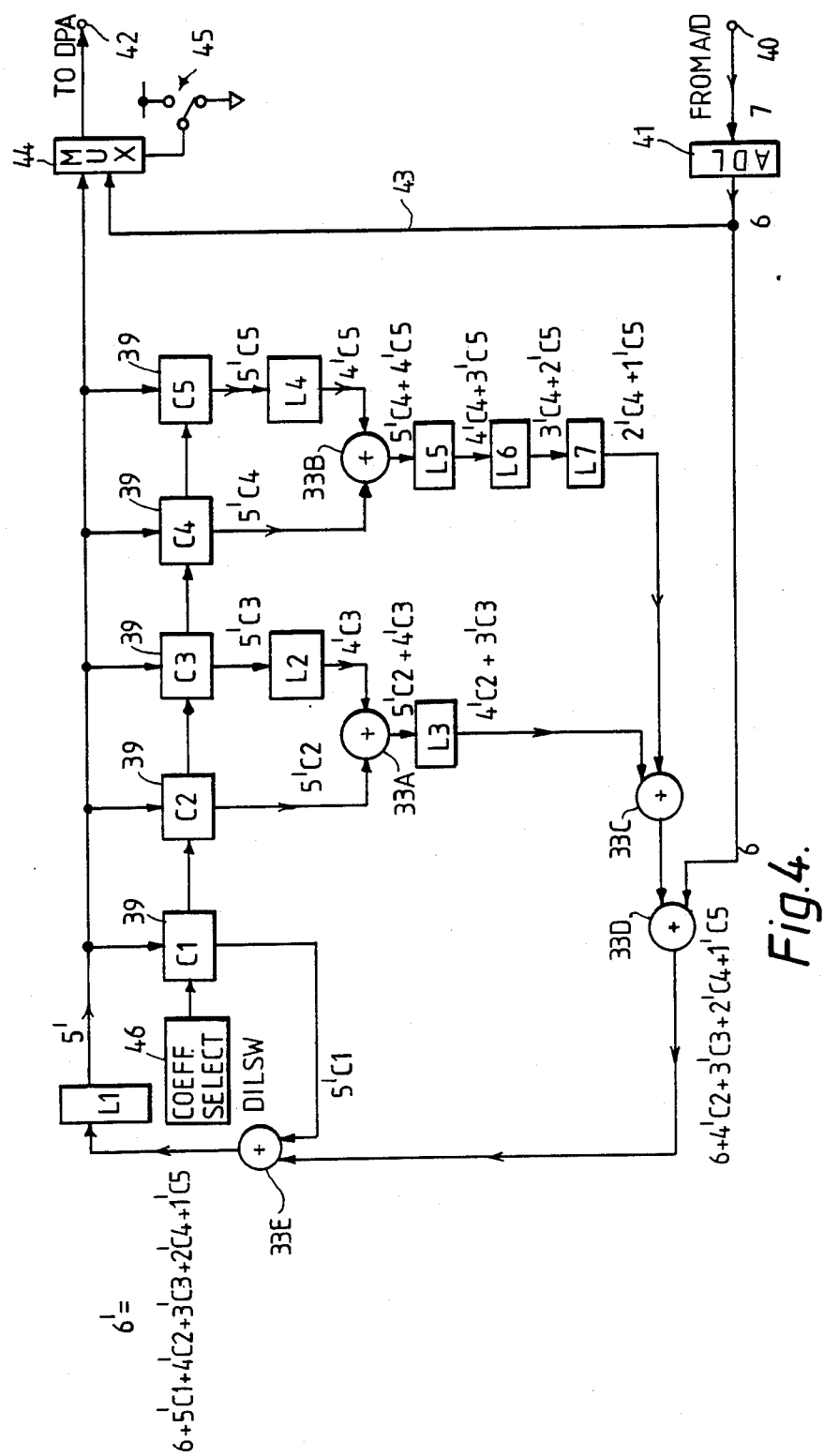
FIG. 4 is a block diagram of a digital filter located upstream of the noise-susceptible link.
Figure 5:
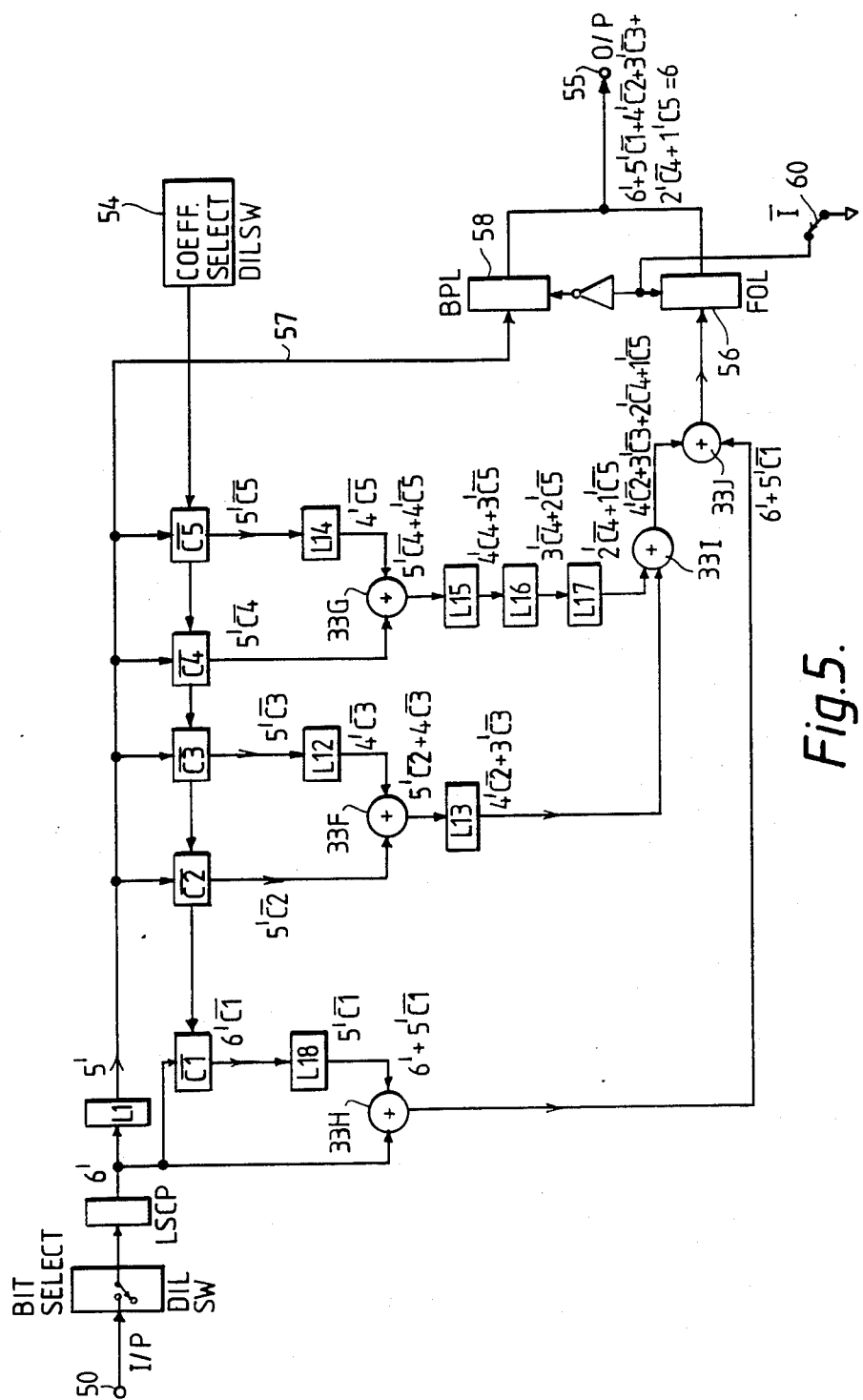
FIG. 5 is a block diagram of a digital filter similar to that of FIG. 4 but located downstream of the noise-susceptible link and having a response characteristic which is the inverse of the response characteristic of the filter of FIG. 4.

In many applications of signal processing arrangements in accordance with the invention filters having the construction shown in FIGS. 2 and 3 and implemented digitally using inexpensive commercially available integrated logic circuitry would have insufficient speed to carry out the necessary filtering operations on a wide bandwidth signal such as a television signal in real time. In such cases the digital filter constructions shown in FIGS. 4 and 5 are of use. Referring to FIG. 4, a so-called inverse filter suitable for use upstream of the noise-susceptible link and having an impulse response 1/P(z) uses a number of delay cells L1 to L7 in the form of integrated circuit latches located inside the filter circuit loop as before but after the weighting multipliers, which are shown in FIG. 4 as a series of coefficient multipliers 39 which store coefficients C1 to C5. More importantly, summation of the partial products produced by the coefficient multipliers is carried out step by step using a number of digital adders 33A to 33E so that the high throughput of arithmetic adding operations is shared between the several adders, with the appropriate delays being generated by storing the partial products obtained from the coefficient multipliers and adders 33A and 33B.

A similar digital implementation of the filter located downstream of the noise-susceptible link and having the reciprocal response P(z) is shown in FIG. 5. In this filter, the individual latches L1 to L8, coefficient multipliers 39, and adders 33F to 33J are similar or identical to the corresponding elements in the filter of FIG. 4, the main difference between the two filters being that one is the inverse of the other in the same way that the filter of FIG. 2 is the inverse of the filter of FIG. 3.

Figure 6:
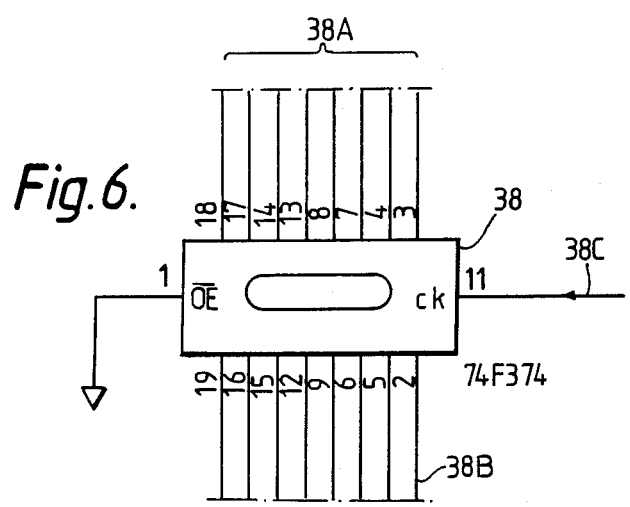
FIG. 6 is a circuit diagram of a latch suitable for use in the filters of FIGS. 4 and 5.
Figure 7:
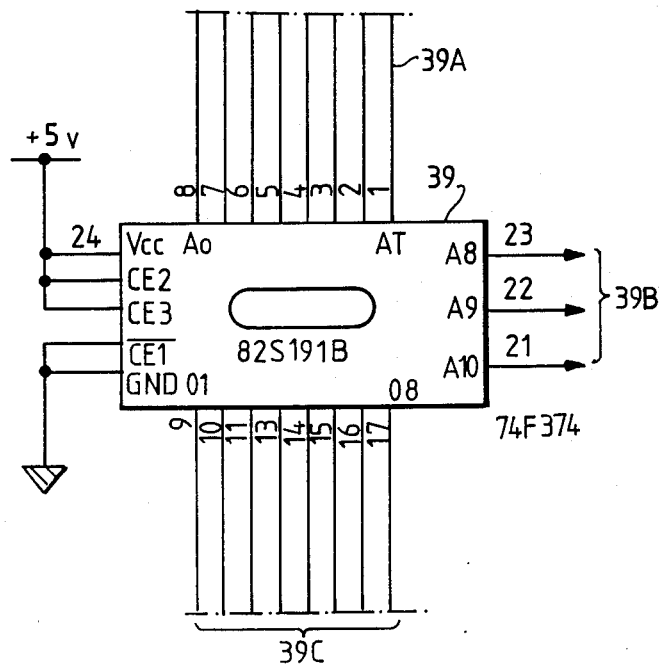
FIG. 7 is a circuit diagram of a programmable read-only memory (PROM) suitable for use as a multiplier in the filters of FIGS. 4 and 5.
Figure 8:
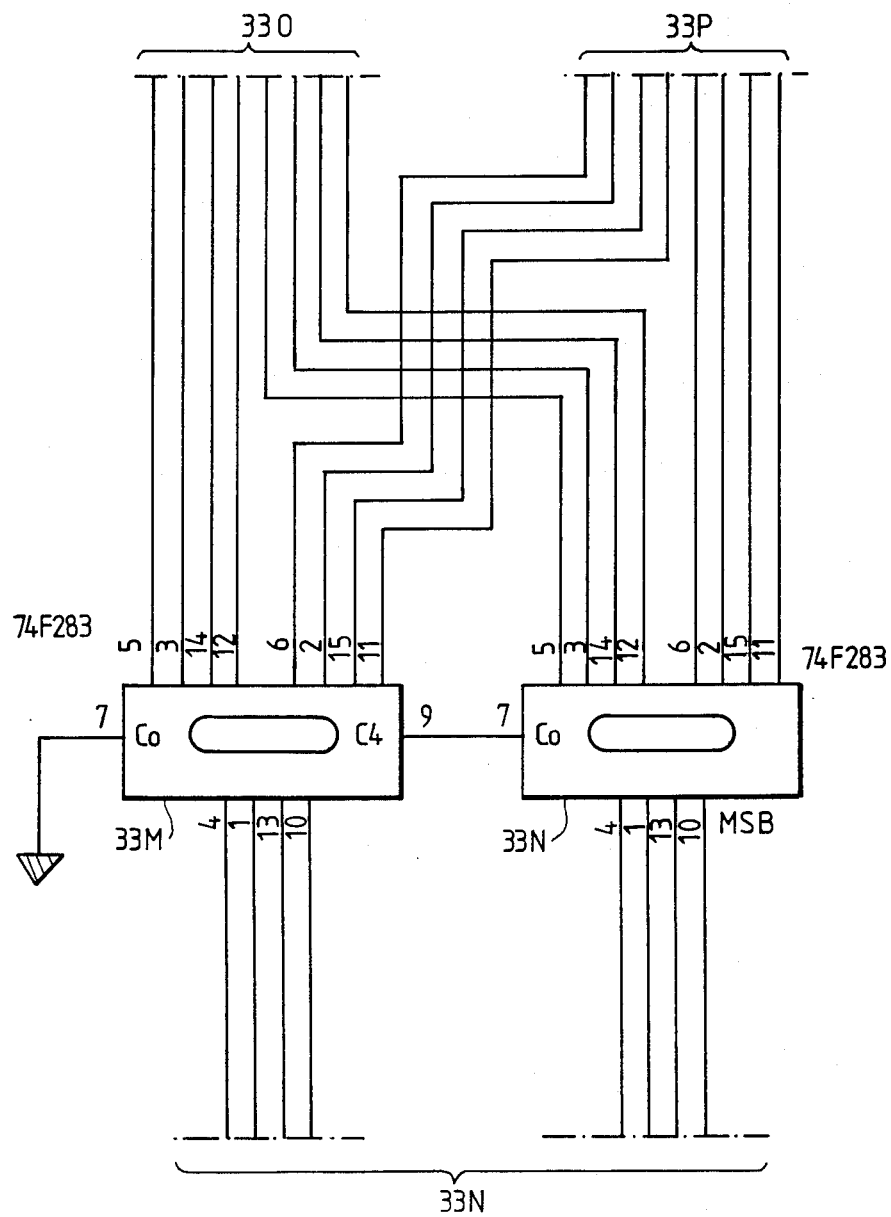
FIG. 8 is a circuit diagram of an adder suitable for use in the filters of FIGS. 4 and 5.

The connections between the elements of the filters of FIGS. 4 and 5 are represented by single lines in the FIGS, but in reality they each represent a number of parallel lines depending on the number of bits of the digital signals being processed. The filters operate typically with 8-bit signals so that each connection comprises 8 parallel lines. FIGS. 6, 7 and 8 show suitable integrated circuit arrangements constituting respectively a latch, a PROM, and an adder, these forming each of the latches L1,L2 etc., coefficient multipliers 39, and adders 33A, 33B etc of FIGS. 4 and 5, where the filters are 8-bit filters. Thus, referring to FIG. 6, each of the latches comprises an integrated circuit 38 type No. 74F374 having eight input leads 38A, eight output leads 38B, and a clock input 38C. Each PROM 39, as shown in FIG. 7, comprises a memory chip 39 type No. 825191B having seven address leads 39A for receiving 81-bit input words, three further address leads 39B for selecting alternative groups of memory locations, and eight output leads 39C for outputting 8-bit words corresponding to the 8-bit words fed to the inputs multiplied by a selected one of the coefficients stored in a lookup table in the memory locations of the chip. Referring to FIG. 8, each adder comprises two integrated adder circuits 33M and 33N of type No. 74F283 to provide a total of 16 input terminals 33O and 8 output terminals 33P. It is the limitation on the number of bits imposed by the adders (or at least the final adder) that causes the filters to operate with modulo N (in this case modulo 256) arithmetic, each adder simply overflowing when its output exceeds 11111111, thereby avoiding instability in the filter upstream of the noise-susceptible link and providing a degree of scrambling of the information signals. By using the same modulo N arithmetic in the reciprocal filter downstream of the noise-susceptible link as in the filter upstream of the link, again, in this example, by using adders (or at least a final adder) which overflow on reaching 256, reciprocity of the two filters is achieved so that the two filters together have substantially no significant effect on the information signal.

Referring again to FIG. 4, the input of the filter is shown by reference 40. From here, the information signal, in 8-bit parallel form, passes through an input latch 41 to the first adder 33D. in this diagram, successive samples of the input signal in time are designated by the numerals 1 to 7, and output samples are designated by the numerals 1' to 6'. Thus, if one views the various parts of the filter at a given instant, if the input sample is designated 7, samples from each successive delay element that the signal passes through are successively earlier samples 6, 5, 4 ... etc. or 6', 5', 4', ... etc.. It will be seen that the delayed input sample 6 is added to a number of partial products generated by coefficient multipliers 39 and latches L1 to L7, to produce at the output of the final adder 33E, an output sample 6' which equals $6+5'C1+4'C2+3'C3+2'C4+1'C5$. This corresponds to the general relationship referred to above for the filter 23 in FIG. 1, i.e.

$$|Y|_N=[X+|Y|_N R(z)].$$

In the present example, the output 42 of the filter, is taken from the output of the first latch L1 for convenience. The arrangement of FIG. 4 also provides a facility for bypassing the filter through line 43 by means of a multiplexer 44 operated by a switching device 45. The filter characteristics can be altered by selecting different stored values of the coefficients in coefficient multiplier PROMS 39 by changing the inputs to the three address lines 39B (see FIG. 7) by means of, for example, coefficient select switches 46.

The filtered samples derived from the output of the filter of FIG. 4 form the basis of the signal which is then passed to the noise-susceptible link. The same signal is picked up by the signal processing means down-stream of the link, and the samples, corrupted by noise, are extracted and fed to the filter of FIG. 5. This filter has the same component parts as the filter of FIG. 4 with the connections altered to effect the reciprocal filtering process. The noise corrupted samples are fed from input 50 via a bit selection device 51 to select the number of bits to be filtered, and a synchronising latch 52 to the first delay element of the filter, which is latch L11. The input sample to latch 11 at a given moment is designated 6'. As in the filter of FIG. 4, a series of further latches L12 to L18 introduce delays into the filter sections after multiplication by a series of coefficient multipliers 53 which store five coefficients $\overline{C1}, \overline{C2}, \overline{C3}, \overline{C4}$ and $\overline{C5}$ in respective memory locations. Selection of the coefficients is performed by a switching device 54. The partial products of 6' and earlier samples 5', 4', 3', 2', and 1' are stored by the latches L12 to L18, and these products are added by five adders 33F–33J, of which at least adder 33J overflows when its output exceeds 11111111. In the present example, all five adders are modulo N adders.

The output of adder 33J at the given moment is given by 6 equals $6'+5'\overline{C1}+4'\overline{C2}+3'\overline{C3}+2'\overline{C4}+1'\overline{C5}$, thereby regenerating the original sample 6 fed to the input of the filter of FIG. 4. It will be seen that this relation corresponds to the general relationship referred to above for the filter 26 in FIG. 1, i.e.

$$|Y|_N=X' [1-R(z)],$$

the coefficients $\overline{C1}$ to $\overline{C5}$ being C1 to C5 with a negative sign.

The output of adder 33J is coupled to the output terminal 55 of the filter via a "filter output" latch 56 which, in conjunction with bypass line 57, bypass latch 58, inverter 59 and switch 60, enable either filtered or unfiltered samples to be supplied to the output 55.

It should be noted that the latches in each filter are all clocked by a respective common clock, which for TV signals, runs at a rate of typically 20 to 30 MHz.

Having described the construction of typical sample data filters for use in the arrangement of FIG. 1, attention can now be directed to further signal processing arrangements similar to that of FIG. 1.

Figure 9:
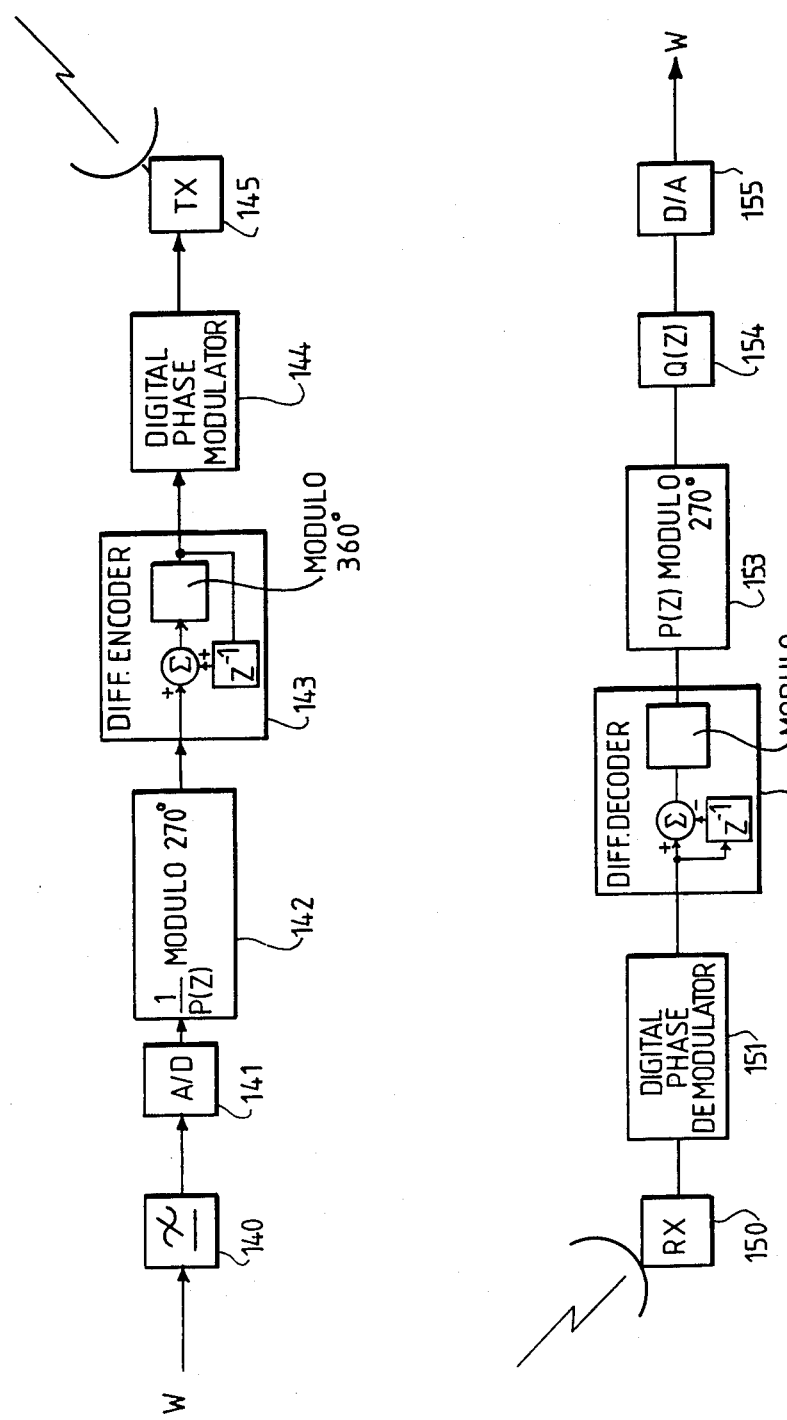
FIG. 9 is a block diagram of a noise-reduction signal processing arrangement for a satellite communications system.

Referring to FIG. 9, an implementation of the general arrangement of FIG. 1 suitable for use in a satellite communication system employs additional components for differential phase modulation of the signal transmitted over the noise-susceptible link.

In the FIG. 9 system, and analogue input signal W is first passed through a low-pass analogue filter 140 before being converted into a digital stream in an A/D converter 141. This digital stream has a maximum amplitude corresponding to a phase modulation of ±100° and is fed to an inverse high-pass filter 142 corresponding in function to the filter 23 of FIG. 1. The filter 142 has a transfer function:

$$[1/P(z)] \text{modulo } 270°$$

so that the filter output is constrained within ±135°. The digital stream output from the inverse filter 142 is then passed through a filter 143 having a transfer function of:

$$[1(1-z^{-1})] \text{ modulo } 360°$$

This filter 143 operates as a differential encoder and has the form indicated in FIG. 9.

The output of the filter 143 is fed as the input to a digital phase modulator 144, for example of the form described in International patent application No. WO84/01874 in the name of Devon County Council and Martin Tomlinson, the disclosure of which is incorporated herein by reference. The phase modulator is then upconverted and transmitted to a communication satellite by a transmitter unit 145.

After re-transmission by the satellite the signal is picked up by a receiver 150 and down-converted to a suitable IF frequency before being fed to a digital phase demodulator 151 (for example, of the form described in the aforesaid International Application).

The output of the demodulator 151 is passed to a filter 152 having a transfer function of:

$$[1-z^{-1}] \text{ modulo } 360°$$

The filter 152 operates as a differential decoder and has the form depicted in FIG. 9. The output of the filter 152 will not be constrained to the amplitude range ±135° as in the equivalent position in the transmitting position of the system, because noise and/or interference components will be present as well as signal components. However, for correct operation the signal and noise components should not exceed ±179° or else "threshold" noise spikes will occur in the system output as in conventional FM transmission operating at low SNR values.

The filter 152 is followed by a digital high-pass filter 153 with a transfer function of:

$$[P(z)] \text{ modulo } 270°$$

The filter 153 corresponds in function to the filter 26 of FIG. 1 and eliminates low frequency noise/interference components without affecting the low frequency signal components.

The output of the filter 153 is fed to a digital low-pass filter 154 (with a transfer function of $Q(z)$) which serves to remove the high frequency noise/interference components. The output of the filter 54 is passed to a D/A converter 54 which produces the analogue signal W.

The values of $P(z)$ and $Q(z)$ for the FIG. 9 system may be the same as the specific values quoted in connection with FIGS. 1 to 3. In this case, the processing gain of the system is such that at an operating carrier to noise ratio of 14 dB, an output SNR of the order of 46 dB is obtained at the final output (taking into account the processing gain advantage resulting from the use of differential phase modulation).

A further advantage of the FIG. 9 system when applied to satellite TV transmission is that there is no need to apply energy dispersal techniques such as are used in current FM satellite TV transmissions; this is due to the fact that the signal is sufficiently scrambled that even for a blank raster signal, there is no significant narrow band spectral energy transmitted.

Figure 10:
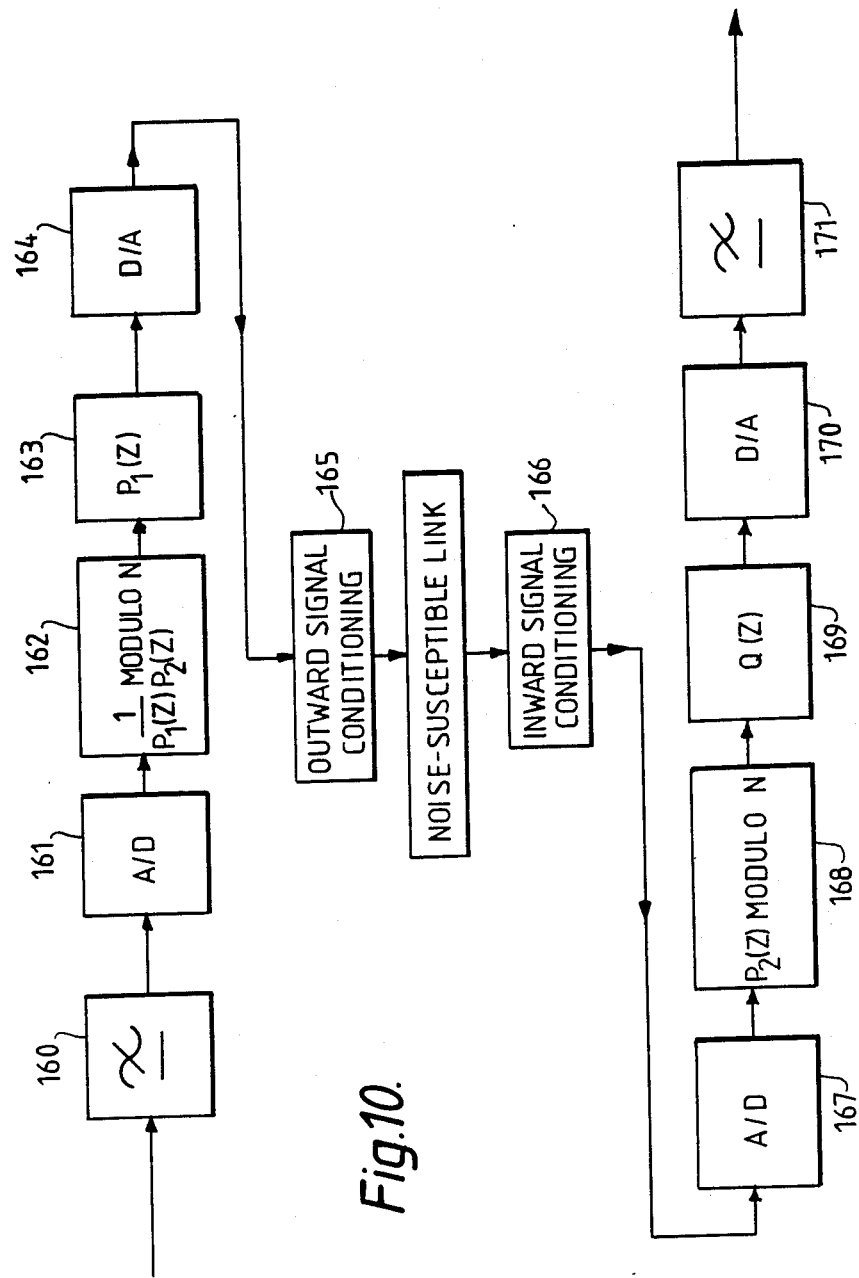
FIG. 10 is a block diagram of a noise-reduction signal processing arrangement provided with a spectral shaping filter.

FIG. 10 shows a signal-handling system similar to that of FIG. 1 but provided with a spectral-shaping filter arrangement.

As before, an analogue input signal W is low-pass filtered in a filter 160 and then digitised in an A/D converter 161 before being passed to an inverse filter 162. The output of the filter 162 is fed to a spectral-shaping filter 163 which is followed by a D/A converter 164 and an outward-signal conditioner 165.

The receiving section of the FIG. 10 system includes an inward-signal conditioner 166, an A/D converter 167, a filter 168 with a transfer function $P_2(z)$ modulo N, a filter 169 with transfer function $Q(z)$, a D/A converter 170, and an analogue low-pass filter 171.

The spectral-shaping filter 163 has a transfer function $P_1(z)$ and serves to eliminate signal energy at frequencies within an unwanted band corresponding to the stopband of filter 163. In order to ensure that valuable signal information is not lost by the spectra-shaping filtering process, the inverse function $1/P_1(z)$ is included in the transfer function of the inverse filter 162 together with the inverse function to that of the filter 168. The overall transfer function of the filter 162 is thus:

$$[1/( P_1(z) \cdot P_2(z) )] \text{ modulo } N$$

With both $P_1(z)$ and its inverse included in the signal processing steps effected upstream of the noise susceptible link, the overall effect of these functions cancels.

The most attractive functions for $P_1(z)$ are low-pass functions since these result in a spectral shape which is narrow band. However, if $P_1(z)$ is a low-pass function, then $P_2(z)$ must necessarily also be low pass otherwise the filters 163, 168 would form an orthogonal filter pair. The result of this is to require the function $Q(z)$ to be a high-pass function in order to retain the noise reduction properties of the system. However, for baseband input the function $Q(z)$ should ordinarily be a low-pass function.

To overcome this conflict, the input signal is shifted in frequency prior to processing by multiplying each even sample output from the A/D converter 162 by $(+1)$ and each odd sample by $(-1)$. This process is then reversed at the input to the D/A converter 170.

One possible choice for $P_1(z)$ is the function $(1+z^{-1})$ which has a transmission zero at half the sampling frequency of the A/D converter 161.

Of course, if a high-pass function for $P_1(z)$ is acceptable, then the above-described modulation/demodulation process is unnecessary.

Figure 11:
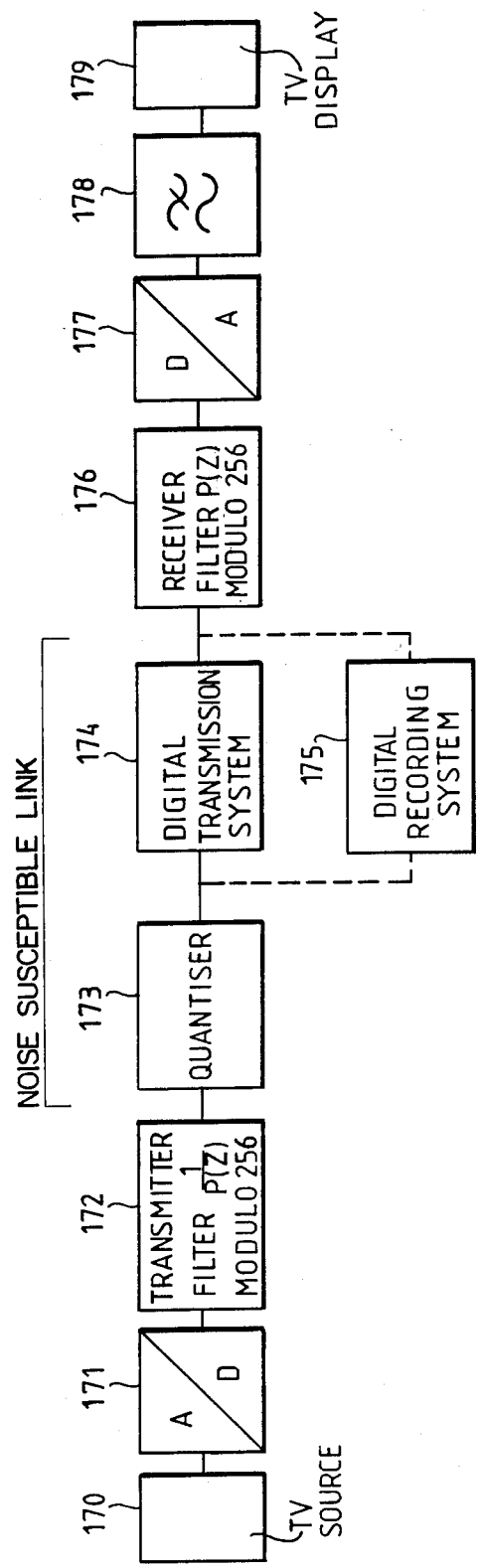
FIG. 11 is a block diagram of a noise-reduction signal processing arrangement for a television signal transmission system.

In a further signal handling system in accordance with the invention, the noise susceptible link includes a signal quantiser, as shown in FIG. 11. In communication systems, and, indeed, recording systems, the bandwidth of the signal to be transmitted determines the complexity of the hardware associated with the system and, in the case of a radio transmission system the size of the frequency spectrum portion that is occupied by the signal. In digital signal transmission and processing it is common to limit the bandwidth of a multiple bit signal by transmitting only the most significant bits. Thus, an 8-bit signal, such as that available at the output of the filter of FIG. 4, may be "quantised" by transmitting only the four or five most significant bits. While this restricts the bandwidth of the signal, it inevitably introduces quantisation errors, or "quantisation noise" as it is sometimes described.

The present invention can be employed in reducing the quantisation noise as shown in FIG. 11, which shows a system for the digital transmission of TV signals. The system includes a TV signal source 170 which is coupled to an A/D converter 171 for sampling the TV signal at a rate in excess of the Nyquist frequency. The converter 171 typically has 8-bit resolution. The resulting digital signal is filtered by a digital filter 172 such as that shown in FIG. 4 having a transfer function given by $[1/P(z)]$ modulo 256. The 8-bit output of the filter is then quantised to, say, 4 bits in quantiser 173, and then transmitted in known manner through a digital transmission system 174 using, for example, pulse code modulation or digital phase modulation, or fed to a digital recording system 175. The signal recovered from the transmission or recording system is filtered by a second digital filter 175 having a transfer function [P(z)] modulo 256 which is the reciprocal of the transfer function of the filter 172. The filter 176 is a high-pass filter and its output (typically an 8- bit output) is connected to a D/A converter 177, and thence to an analogue low-pass filter 178 and a TV display 179. The quantisation noise generated by the quantiser 173, together with any errors or noise introduced by the digital transmission system or recording system, is attenuated by the filter 176 and by the following low-pass filter 178.

A second effect of the arrangement is that the filter 172 produces a pseudo-random output so as to break up any discrete spectral lines present in the TV signal. This avoids the quantisation effect known as "contouring" which occurs when a static image is too coarsely quantised. The scrambling of the signal by the filter 172 gives rise to random, uniformly distributed, white quantisation noise when the signal is quantised.

Figure 12:
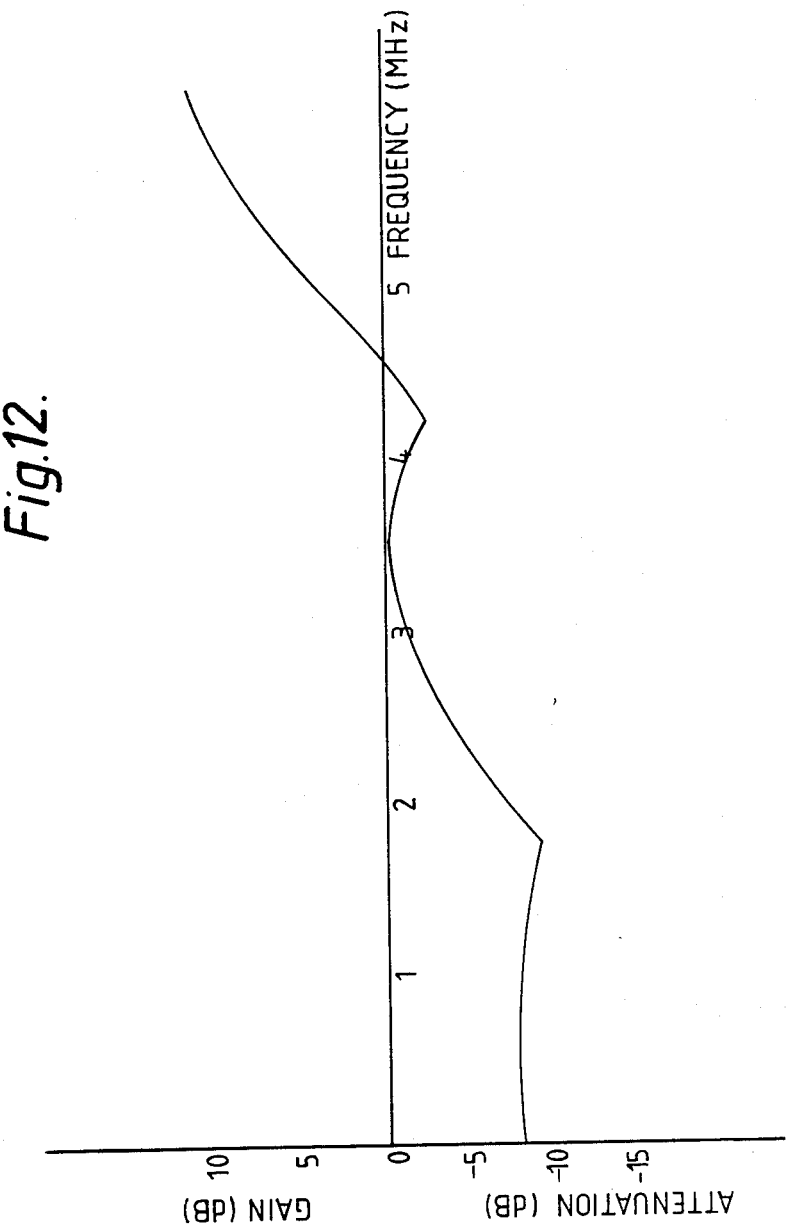
FIG. 12 is a graph of the frequency response of the digital filter located downstream of the noise-susceptible link in the arrangement of FIG. 11.

With regard to the response characteristics of the digital filter downstream of the noise-susceptible link, a transfer function which has been found to be particularly suitable for use with television signals is defined by $P(z) = 1 - 1.13z^{-1} + 0.86z^{-2} - 0.65z^{-3} + 0.55z^{-4} - 0.23z^{-5}$. The coefficients $-1.13$, $0.86$, $-0.65$, $0.55$ and $0.23$ can be incorporated in PROM multipliers as in the filters of FIGS. 4 and 5 (as coefficients of the opposite sign in the filter of FIG. 4 and as coefficients of the same sign in the filter of FIG. 5, since $R(z) = 1.13z^{-1} - 0.86z^{-2} + 0.65z^{-3} - 0.55z^{-4} + 0.23z^{-5}$). The frequency response of a filter having this transfer function P(z), for small signals of magnitude much less than N, is shown in FIG. 12. It can be seen that the filter is a high-pass filter having attenuation at frequencies below 65% of the maximum frequency, and it is for this reason that the filter is particularly advantageous for use with TV signals, where low frequency noise is more detrimental to picture quality than high frequency noise.

The low frequency quantisation noise is attenuated by the filter 176 while high frequency quantisation noise is enhanced. The weighted signal-to-noise ratio (SNR) can be improved by approximately 8 dB due to the filtering compared with the original flat quantisation noise. This is illustrated by analysis of the peak signal to mean square noise power ratio for pulse coded modulation, which is based on the classic formula $10 \log_{10} 12N^2$, where N is the number of levels. The actual signal power is reduced by 3 dB from the value due to the provision of power for synchronisation pulses. Using the above formula, the unweighted SNR function against the number of bits is as tabulated in Table I below. The table also includes the weighted SNR, assuming a sampling rate of 13 MHz.

TABLE I

| No. of bits | Unweighted SNR(dB) | Weighted SNR(dB) |
|---|---|---|
| 4 | 31.9 | 40 |
| 5 | 37.9 | 46 |
| 6 | 43.9 | 52 |
| 7 | 49.9 | 58 |
| 8 | 55.9 | 64 |

For comparison, measurement of the weight SNR of a system constructed in accordance with block diagram of FIG. 11 produced the SNR shown in Table II below.

TABLE II

| No. of bits | Weighted SNR(dB) |
|---|---|
| 4 | 48 |
| 5 | 54 |
| 6 | 60 |

This result indicates that a good quality television signal can be transmitted by the system of FIG. 11 using 5 bits per sample to give a weighted SNR of 54 dB for a data rate of 65 M bits per second. Moreover there are no artefacts present in the signal and contouring is substantially absent with 6, 5, or 4 bits per sample.

Since there is no introduction of artefacts, i.e. since the system is transparent, various common TV signal types such as NTSC, PAL, SECAM or the MAC variants can be used.

I claim:

1. A signal processing arrangement for reducing the effect of noise in a signal-handling system that includes a noise-susceptible link, the arrangement comprising:
   first signal processing means located upstream of the link and arranged to receive and process prior to passage over the link an information signal whose frequency components of interest lie within a predetermined frequency range, and
   second signal processing means located downstream of the link and arranged to recover the information signal from the noise-corrupted signal received over the link,
   the second signal processing means including first and second filters the passband of the second of which spans the said predetermined frequency range, and the first signal processing means including an inverse filter to the first filter, the inverse filter and the first filter being constituted by sampled data filters employing modulo N arithmetic and the first filter, apart from effects resulting from its modulo N implementation, being substantially orthogonal to the second filter.

2. An arrangement according to claim 1, wherein the first filter and second filter are high and low pass filters respectively.

3. An arrangement according to claim 1, wherein the noise-susceptible link includes a quantizing circuit.

4. A communications receiver for receiving an information carrying signal transmitted over a noise-susceptible link after having been subjected to filtering by a digital filter employing modulo N arithmetic and having an impulse response characteristic (1/P(z)) modulo N, wherein the receiver comprises a first digital filter employing modulo N arithmetic and having an impulse response characteristic at least approximating p(z) modulo N where $$((1/P(z)) \text{ modulo } N) \cdot (P(z) \text{ modulo } N) = 1,$$

where P and Q are the transfer functions of the filters and z and N are variables and a second filter having an impulse response characteristic Q(z) where, for signals at the input of the first filter having a magnitude less than N/2, Q(z) is defined substantially by $P(z) \cdot Q(z) = 0$.

5. A method of reducing the effect of noise in a signal-handling system that includes a noise-susceptible link, including the steps of:
   feeding an information signal, which has frequency components of interest lying within a predetermined frequency range, to a first sampled data filter having a predetermined impulse response combined with a modulo N overflow characteristic, passing the filtered information signal over the noise susceptible link, receiving the filtered information signal from the noise susceptible link and feeding it to a second sampled data filter which has a modulo N overflow characteristic and is substantially the reciprocal of the first sampled data filter, and passing the signal present at the output of the second sample data filter through circuit means including a third filter, which third filter has a pass-band including the said frequency range and is substantially orthogonal to the said second filter in respect of signals received at the input of the second filter with a magnitude less than $N/2$, whereby noise received by the second filter having an amplitude less than $N/2$ is largely eliminated by the orthogonal pair formed by the second and the third filters.

6. A method according to claim 5, further comprising the step of obtaining said information signal fed to the said first filter from an analogue to digital converter, and the step of passing the signal present at the output of the second sample data filter through a digital to analogue converter in said circuit means including said third filter.

7. A method according to claim 5, further comprising the step of quantizing a representation of the signal obtained at the output of the said first filter to provide a digitally coded signal as the signal transmitted by the link.

8. A method according to claim 7, wherein the signal obtained at the output of the said first filter has $\log_2 N$ bits and further comprising the step of quantizing the signal obtained at the output of said first filter so that the quantized representation thereof has $(\log_2 N - 2)$ bits or a smaller number of bits.

9. A method according to claim 5, wherein the first and second sampled data filters are digital filters, and each filter contains at least one logic device having an overflow characteristic for limiting the output of the filter to a maximum value.

10. A satellite communications receiver for receiving an information signal over a noise-susceptible link from a transmitter having a digital sampled data transmitter filter using modulo N arithmetic, wherein the receiver includes a digital sample data first receiver filter using modulo N arithmetic, and a second receiver filter which, apart from effects resulting from the modulo N arithmetic of the first receiver filter, has a transfer function which is substantially orthogonal to the transfer function of the first receiver filter.

11. A receiver according to claim 10, wherein the first and second receiver filters are high-pass and low-pass filters respectively.

12. A receiver according to claim 10, wherein N equals 256.

13. A receiver according to claim 10, including means coupled to the output of the second receiver filter for feeding the filtered information signal in analogue form to a television display.

14. A signal processing arrangement for reducing the effect of noise in a signal-handling system that includes a noise-susceptible link, the arrangement comprising:

first signal processing means located upstream of the link and arranged to receiver and process prior to passage over the link an information signal whose frequency components of interest lie within a predetermined frequency range, comprising input means for receiving an analogue signal, an analogue to digital converter, a digital filter having an impulse characteristic $1/P(z)$ and employing modulo N arithmetic, and output signal conditioning means for feeding the filtered information signal to the said link, and second signal processing means comprising input signal conditioning means for receiving the information signal from the said link, first digital receiver filter coupled to the input signal conditioning means and having an impulse response at least approximating to $PZ(z)$ and employing modulo N arithmetic, a second receiver filter coupled to receive signals representative of an output of the first receiver filter and having an impulse response characteristic $Q(z)$, where $Q(z)$ is defined by $P(z) \cdot Q(z) = 0$, and P and Q are the transfer functions of the filters and z and N are variables, digital to analogue converter means coupled to the output of one of said receiver filters and arranged such that information at the output of the second receiver filter is made available in analogue form.

15. An arrangement according to claim 14, wherein the first receiver filter is a high-pass filter and the second receiver filter is a low-pass filter.

16. An arrangement according to claim 14, wherein the input means is coupled to a television signal source, the noise-susceptible link is a television satellite link, and the second signal processing means is coupled to a television display.

17. An arrangement according to claim 14, wherein each of the said digital filters has at least one logic circuit for limiting the maximum value of its output to effect the module N characteristic of the respective filter.

18. An arrangement according to claim 17, wherein the each of said logic circuits is an adder which overflows when the sum of its inputs reaches N.

* * * * *

UNITED STATES PATENT AND TRADEMARK OFFICE
CERTIFICATE OF CORRECTION

PATENT NO. : 4,860,317
DATED : August 22, 1989
INVENTOR(S) : Martin Tomlinson

It is certified that error appears in the above—identified patent and that said Letters Patent is hereby corrected as shown below:

Column 2, line 64, "noise/reduction" should be --noise-reduction--.

Column 4, line 16, "[I+N/2/N]" should be $--[\frac{I+N/2}{N}]--$.

Column 4, line 60, "N2/4" should be $--N^2/4--$.

Column 5, line 14, "R(Z)" should be --R(z)--.

Column 5, lines 21-22, "0.2-55z$^{-5}$" should be --0.255z$^{-5}$--, and the term should appear on one line.

Column 5, lines 51-52, "0.25-2z$^{-3}$" should be --0.252z$^{-3}$--, and the term should appear on one line.

Column 10, line 2, "spectra-shaping" should be --spectral-shaping--.

Column 11, lines 24-25, "0.55z$^{314}$" should be --0.55z$^{-4}$--, and the term should appear on one line.

Column 11, lines 30-31, "0.23z$^{--5}$" should be --0.23z$^{-5}$--, and the term should appear on one line.

Column 14, line 14 (Claim 14), "receiver" should be --receive--.

UNITED STATES PATENT AND TRADEMARK OFFICE
CERTIFICATE OF CORRECTION

PATENT NO. : 4,860,317

DATED : August 22, 1989

INVENTOR(S) : Martin Tomlinson

It is certified that error appears in the above-identified patent and that said Letters Patent is hereby corrected as shown below:

Column 14, line 26 (Claim 14), after "link," insert --a--.

Signed and Sealed this

Nineteenth Day of March, 1991

Attest:

HARRY F. MANBECK, JR.

*Attesting Officer*      *Commissioner of Patents and Trademarks*